E. G. GEREKE.

FOLDING BOX.

APPLICATION FILED JULY 24, 1922.

Reissued Sept. 12, 1922. 15,453.

INVENTOR
Edward G. Gereke
BY Bakewell & Pond
ATTORNEYS

Reissued Sept. 12, 1922. Re. 15,453

UNITED STATES PATENT OFFICE.

EDWARD G. GEREKE, OF ST. LOUIS, MISSOURI, ASSIGNOR TO GEREKE-ALLEN CARTON COMPANY, OF ST. LOUIS, MISSOURI, A CORPORATION OF MISSOURI.

FOLDING BOX.

Original No. 1,364,839, dated January 4, 1921, Serial No. 232,280, filed May 3, 1918. Application for reissue filed July 24, 1922. Serial No. 577,230.

*To all whom it may concern:*

Be it known that I, EDWARD G. GEREKE, a citizen of the United States, residing in St. Louis, Missouri, have invented a certain new and useful Improvement in Folding Boxes, of which the following is a full, clear, and exact description, such as will enable others skilled in the art to which it appertains to make and use the same.

This invention relates to folding cardboard boxes of the type in which the end walls of the box are formed by co-operating extensions or portions on the two side walls and on the bottom of the box that are lapped one over the other.

One object of my invention is to provide a folding cardboard box of the general type referred to in which the overlapping portions forming each end wall of the box are securely locked together in a novel manner that eliminates the possibility of said portions accidentally separating or pulling apart.

Another object is to provide a folding cardboard box of the kind above referred to that can be set up quickly and which is so constructed that the devices used to lock the end wall portions together will snap into position with a decided click during the operation of setting up the box, and thus notify the operator that the overlapping portions which constitute the end walls are securely locked together.

Figure 1:
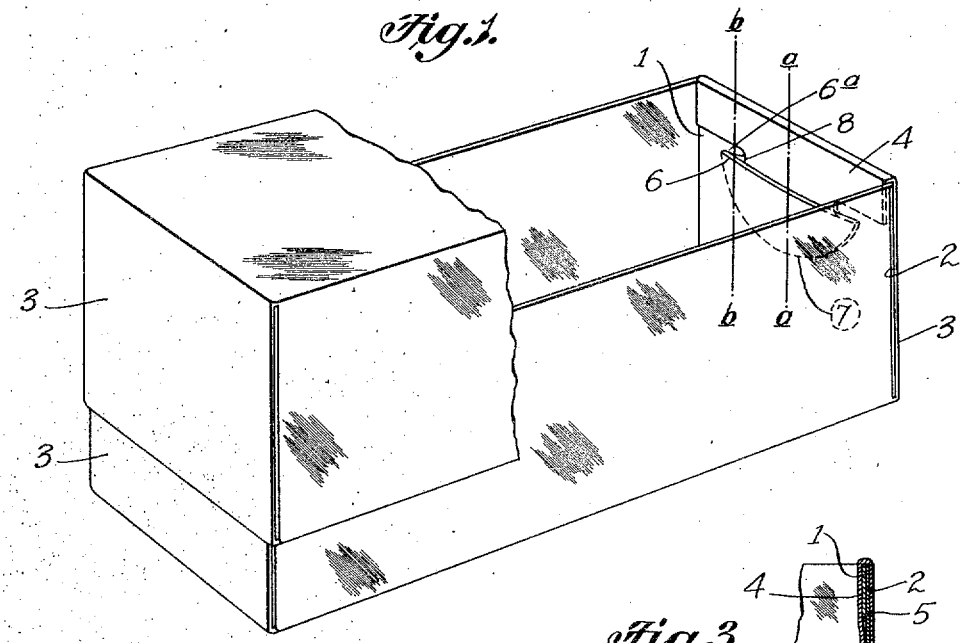

Figure 1 of the drawings is a perspective view of a folding box constructed in accordance with my invention.

Figure 3:
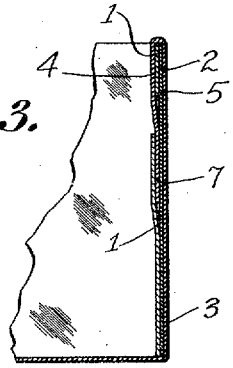
Figure 2:
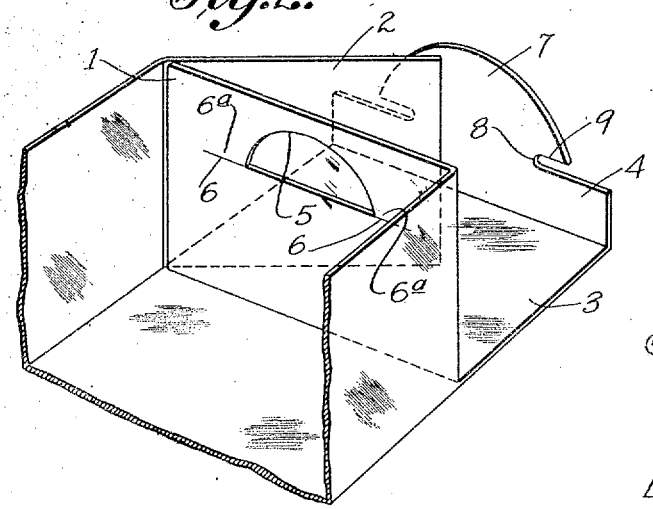
Figure 4:
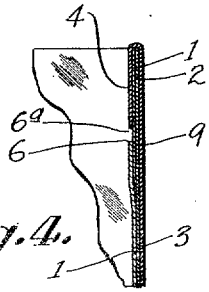

Figure 2 is a perspective view of part of the box, showing the overlapping portions that form one of the end walls unfolded; and Figures 3 and 4 are sectional views, taken on the lines *a—a* and *b—b* of Figure 1.

I have herein illustrated my invention embodied in a telescoped box comprising a lower portion and a top portion, both of which are constructed in the same manner and formed from a sheet of cardboard or other suitable material that is cut and scored by ordinary dies and then folded into final position. Each end wall of the lower portion of the box is formed by two extensions 1 and 2 on the side walls and an extension 3 on the bottom of the box, said extensions being lapped one over the other and held in position by a flap 4 on the upper edge of the extension 3 that is folded inwardly and downwardly over the extension 1. In the form of my invention herein illustrated the extension or portion 1 that forms the inner side of the end wall is provided with an opening 5 and with two horizontally-disposed slits 6 that extend laterally in opposite directions from the opposite ends of the lower edge of said opening 5. The flap 4 is provided with a flat tongue comprising a head portion 7 and a centrally-disposed neck portion 8, the width of said head portion 7 corresponding to the horizontal distance between the outer end of the slit 6 at one side of the opening 5 and the outer end of the slit 6 at the opposite side of said opening, and the width of said neck portion 8 preferably corresponding to the length of the widest portion of the opening 5 in the inner portion 1 of the end wall. Said tongue is provided with shoulders 9 that are arranged at opposite sides of the neck portion 8 and so disposed with relation to the slits 6 that when said tongue is in operative position the shoulders 9 thereon will bear against co-operating shoulders on the portions $6^a$ of the extension 1 that lie above the slits 6. After the flap 4 has been folded inwardly and downwardly over the lapped end portions of the box, the tongue on said flap is locked in position by forcing the head portion 7 of the tongue downwardly through the opening 5 and horizontally-disposed slits 6 in the inner portion 1 of the end wall. The head 7 of the tongue is preferably tapered or made substantially semi-circular-shaped in outline so that when it is introduced into the opening 5 the end portions of said head will flex the portions $6^a$ of the extension 1 rearwardly as the head on the tongue passes downwardly through the opening 5 and slits 6. When the head on the tongue of the flap 4 reaches its final position the portions $6^a$ will spring forwardly sufficiently to cause the lower horizontal edges of same to bear against the shoulders 9 on the head of the tongue, thereby securely locking the tongue in position. The tongue on the flap 4 is deep enough to completely cover the opening 5 in the inner portion 1 of the end wall, and as the head on said tongue is positioned between the overlapping portions 1 and 2 of the end wall and is prevented from moving upwardly by the engagement of the portions 6[a] with the shoulders 9 on the head of the tongue, there is no possibility of the end walls of the box pulling apart or becoming released by the contents of the box striking against the end wall locking means during the operation of removing the contents of the box, as so often occurs with the folding boxes of this general type now in use. A cardboard box of the construction above described is exceptionally strong and rigid, owing to the fact that each end wall of same is composed of three overlapping portions that are locked together in such a manner that it is impossible for them to accidentally pull apart; and the box can be manufactured at a low cost, owing to the fact that it is formed from a flat sheet of cardboard that can be cut and scored by ordinary dies of simple design. Moreover, such a box can be set up quickly, due to the fact that the openings 5 in the inner portions 1 of the end walls permit the tongues on the end wall flaps to be easily inserted between the portions 1 and 2 of the end walls without the necessity of first spreading or opening up the slits through which said tongues pass. Nor is it necessary to crease or deform the tongues on the end wall flaps before they can be inserted in the slits 6, as the length of the horizontally-disposed slit in each end wall is at least equal to the width of the head portion 7 of the tongue which is inserted through same. When the tongues on the end wall flaps are forced downwardly through the slits in the end walls they will snap into final position with a decided click, thus notifying the operator that the overlapping end wall portions of the box are securely locked together.

Having thus described my invention, what I claim as new and desire to secure by Letters Patent is:

1. A folding cardboard box having a wall composed of at least two overlapped portions, a flap on the outer portion of the wall that laps over the inner portion of the wall, a tongue on said flap, the inner portion of the wall having an opening of such size that the free end of said tongue can be inserted in same and then forced into position between the inner portion of the wall and the adjacent portion without first spreading said portions apart or deforming the tongue, slits that branch laterally from said opening, and locking shoulders on said tongue that are engaged by parts on the inner portion of the wall located above said slits when said tongue reaches its final position.

2. A folding cardboard box provided with a wall composed of an outer portion, an inner portion and an intermediate portion, said inner portion having a slit and an opening at the upper edge of said slit located intermediate the ends of the slit, a flap on the upper edge of the outer portion of the wall that laps over the inner portion of the wall, a tongue on said flap provided with a head and a reduced neck, the width of said head being less than the length of said slit and the opening above said slit being of such size that the free end of said tongue can be inserted in same and then forced into position between the inner portion of the wall and the intermediate portion without first spreading said portions apart, and locking shoulders on said head that are engaged automatically by parts on said inner wall portion located at the sides of said opening when said tongue is inserted in said opening and forced into final position between the inner portion and the intermediate portion of the wall.

3. A folding cardboard box, the end walls of which are composed of an outer portion and inner portions, the latter being extensions of the side walls, a flap on the outer portions which, in the assembling of the box is folded over the inner portions, said inner portions having sector-shaped openings, the straight sides of which are extended by slits, and sector-shaped tongues having reduced necks on said outer portions and which, in the assembling of the box, are passed through said openings, the lower sides of said tongues on each side of the necks interlocking with the upper sides of said slits when the box is fully assembled.

4. A folding cardboard box having an end wall composed of a plurality of overlapped portions, a flap on one of said portions which is adapted to be folded over the inner side of said end wall during the operation of assembling the box, the inner portion of said end wall having an opening, one of whose edges is extended by a lateral slit so as to form a shoulder on said end wall, and a tongue on said flap adapted to be inserted in said opening and forced through said slit, said tongue having a locking shoulder that snaps into engagement with the shoulder on said end wall formed by said lateral slit when said tongue reaches its final position.

EDWARD G. GEREKE.